Patented May 12, 1931

1,805,127

UNITED STATES PATENT OFFICE

JOSEPH BILLING, OF SPONDON, NEAR DERBY, ENGLAND, ASSIGNOR TO CELANESE CORPORATION OF AMERICA, A CORPORATION OF DELAWARE

PROCESS FOR CONCENTRATING AQUEOUS SOLUTIONS OF LOWER ALIPHATIC ACIDS

No Drawing. Application filed July 1, 1929, Serial No. 375,341, and in Great Britain July 11, 1928.

This invention relates to improvements in the concentration of aqueous solutions of lower aliphatic acids and particularly to the production of highly concentrated acetic acid by concentration of dilute acetic acid of whatever origin, such as crude pyroligneous acid, acetic acid obtained as a waste product in acetylation processes such as the acetylation of cellulose, fermentation acid, etc.

As is known, when extracting acetic acid from its aqueous solutions with solvents such as ether, ethyl acetate and the like, acetic acid of concentration only up to about 70% is obtainable, due to the fact that water is soluble to some extent in these solvents. Owing to the good solvent power of such solvents for acetic acid however, it is not difficult to secure almost complete extraction of the acid, leaving but little in the residual aqueous liquid. On the other hand the commercially available liquids of suitable boiling point and in which water is substantially insoluble, such as benzol or petroleum ether, have in general somewhat low solvent power for acetic acid in presence of water, i. e. the partition coefficient between the solvent and water with respect to acetic acid is very low; the efficiency of the extraction process is therefore very low. For example, if a 20–25 per cent aqueous solution of acetic acid be extracted with an equal quantity of petroleum ether only about 2–4 per cent of the acid originally in the aqueous solution is extracted. Thus the use of solvents such as benzene and petroleum ether is uneconomic, since very large quantities of the solvent are required.

According to United States Patent No. 1,696,432 granted December 28, 1928, aqueous acetic and other lower aliphatic acids are concentrated by extracting with a medium consisting of a solvent for the acid, such as ether, in admixture with a hydrocarbon such as benzol or petroleum ether. By this means acetic acid of high concentration can be readily obtained, for example 90–95 per cent.

As a result of further investigations in this field it has been found that, particularly when starting with dilute aqueous solutions of lower aliphatic acids, the efficiency of the concentration process can be enhanced as compared with that of the process of United States Patent No. 1,696,432 and very considerably enhanced as compared with other prior processes by carrying out the concentration in a pluraliay of (i. e. two or more) stages by extraction with solvent media, the extracting media being so chosen that in the ternary mixture the ratio of the solubility of the lower fatty acid in the extracting medium to that of water in the extracting medium increases successively from stage to stage.

In general it is found in practice that the best results are obtained by the use of a series of concentration operations employing extracting media having a progressively decreasing solvent power for water.

This new method of concentration in stages by extraction with solvent media possesses very considerable advantages over the known methods for the concentration of aqueous lower aliphatic acids, more particularly when it is desired to produce highly concentrated acids from dilute acids, for example acetic acid of 95% or over from acetic acid of 20–30%. As indicated above the commercially available liquids which are good solvents for acetic acid and which give almost complete extraction with moderate amounts, have somewhat high solvent power for water. On the other hand those solvents in which water is but little soluble only extract very small amounts of acetic acid from its dilute equeous solutions and very large quantities, and in consequence large apparatus, are necessary to secure approximately complete extraction. When producing concentrated acids by concentrating in stages according to the present invention the necessity for using very large quantities of solvent disappears since for the first stage the extracting solvent may be selected principally for its good solvent power for the acid, and substantially complete extraction may be attained with a moderate quantity; less regard need be paid to the question of the solubility of water therein since a moderate amount of water can readily be separated from the acid in the subsequent stage or stages of the process.

The two or multi stage extraction process of the present invention presents the further advantage that many extracting media, e. g. benzol, when used to extract acids of high concentration as supplied for example to the later stages of the present process, have a higher solvent power for the acid as compared with that of water for the acid than when used to extract acids of lower concentration.

In addition, the second or subsequent extraction processes need not be carried out so as to exhaust the aqueous liquor of acid but may be discontinued when an appreciable amount of acid remains in the aqueous residue which may be returned to the appropriate stage for further concentration; in this way the amount of solvent necessary in these stages is still further reduced. It will be seen that the new two stage or multi stage process, enables highly concentrated acetic or other lower aliphatic acids to be produced from dilute aqueous solutions by the employment of smaller apparatus and reduced quantities of extracting media for a given output of acid as compared with known processes.

Usually it is sufficient to carry out the concentration of the aqueous lower fatty acids in two stages. Preferably in the first stage acid of about 50-70% concentration is produced by extracting the aqueous acid with a good solvent for the acid, substantially the whole of the acid being removed from the liquid. Thus the dilute lower fatty acid, for example aqueous acetic acid of 20-25 per cent such as is obtained as a bye product in the manufacture of cellulose acetate is extracted with a good solvent for the lower fatty acid, such as ether or a mixture of ether with a moderate amount, for example up to 20-30 per cent of petroleum ether the extract being distilled and the ether or other solvent returned to the process; in this manner acetic acid of 50-70 per cent or higher strength is readily obtained the residue containing a negligible amount of acid. The partially concentrated acid is then further concentrated for example to 90-98 per cent, by extraction with an extracting medium for which the aforementioned ratio of solvent power for fatty acid to solvent power for water is greater than the ratio for the first extraction medium for example a mixture of ethyl ether and petroleum ether (say 50-70 per cent ethyl ether), or methylene chloride; the second extraction process may be discontinued while an appreciable amount of acid remains in the residues since the latter may be returned to the first stage of the process for reconcentration up to say 50-70 per cent.

Though reference to concentration in two stages has been made the invention is not limited thereto since three or more stages may be employed if desired.

The ether and ethyl acetate or other solvents for lower aliphatic acids may be used as extracting media alone or with salts according to the known art to reduce their solubility in water. They may also be used in admixture with hydrocarbons, in the manner described in United States Patent No. 1,696,432, or with other similarly acting substances having low solvent power for water, for example a halogenated hydrocarbon such as methylene chloride or carbon tetrachloride; such admixture forms a ready means of reducing the solubility of water in the extracting media to almost any desired extent. To obtain highly concentrated acid the last stage or stages of the concentration should be carried out with extracting media in which water is substantially insoluble, for example hydrocarbons, e. g. petroleum ether or aromatic hydrocarbons such as benzol, halogenated hydrocarbons such as methylene chloride, ethylidene chloride, trichlorethylene or carbon tetrachloride, used either alone or in admixture with one another or with other solvents for the acids, e. g. ether or ethyl acetate. The extraction media may with advantage, particularly in the last stage of the concentration process, be such as will form azeotropic mixtures with water, so that on distilling the extract some or all of any dissolved water will distil away with the extracting media. Methylene chloride is a particularly useful extracting medium for the last concentration operation owing to its low boiling point (41.6° C.) and low solvent power for water; it has the further advantage of forming with water a mixture which boils constantly at about 39° C.; hence on distilling it off from the extract such small quantities of water as have been taken up pass over with it leaving substantially anhydrous acid.

The extracting medium or its components will preferably have boiling points which differ widely from that of the acid to be concentrated so as to simplify the subsequent separation of the extracting medium from the acid; the use of extracting media having boiling points sufficiently below that of the acid to permit of easy separation by fractional distillation is particularly to be recommended.

The extraction processes may be carried out in any well known manner for example by thorough mixing of the acid and the extraction medium and then allowing to separate into layers, or by extraction in a column using the counter-current principle in which case the column may if desired be filled with any suitable packing. If the extracting medium is specifically lighter than the aqueous acid, the latter will be introduced at the top of the column and the medium at the bottom, while the reverse will obtain if the medium is specifically heavier. Either or both the acid and the extracting medium may be introduced into the column through sprays, nozzles and the like. The extraction product may be carried directly to the distilling apparatus and the heat of the vapors of the extracting medium may be utilized to heat the extraction product before it enters the still. The extracting medium after separation from the extract is returned to the process.

A further method of carrying out the extraction consists in introducing the extraction medium in the form of vapor into the acid still in the liquid form, and in this case, if the extraction medium consists of a mixture, the components thereof should preferably have boiling points not too far removed from each other as this facilitates obtaining a mixture of the two vapors in any desired proportion. Alternatively however, the components of the extraction medium may be separately vaporized and introduced in the desired proportions into the conduit leading to the extraction apparatus.

The extraction with vapors may be carried out in a column apparatus, the acid being introduced at the top in the form of a spray and being if desired preheated, while the vapor of the extracting medium is introduced at the bottom. The tower or column is preferably packed with any suitable materials so as to obtain good mixing and may also be provided with a heating jacket. In this case again the extraction product may be drawn off directly into the fractionating still and the vapors of the extracting medium may be taken directly from the distilling apparatus to the extraction column to be utilized for extracting further quantities of dilute acid.

The following examples illustrate the invention but are not to be considered as in any way limiting it.

*Example 1*

Weak acetic acid produced in the manufacture of cellulose acetate and of 15–30% concentration, is extracted with commercial ether in a counter-current scrubbing apparatus. 98–99% of the acid is extracted and on distillation the extract yields acid of about 70% concentration. The remaining 1–2% of the acid along with the water and waste cellulose products precipitated during the extraction, are dealt with as effluent.

The 70% acid thus obtained is further concentrated by extraction in a similar apparatus with methylene chloride, 90–95% of the acid content being extracted; the remaining 5–10% is returned as acid of 30% concentration for reconcentration by extraction with ether.

The methylene chloride extract consists of approximately 22 vols. of 91% acetic acid to 88 vols. of methylene chloride. On distillation this yields acetic acid of 97–98% concentration the methylene chloride and water distilling off together as an azeotropic mixture boiling at 39° C.

*Example 2*

Weak acetic acid is concentrated to 70% by extraction with ether as described in Example 1. The 70% acid so obtained is further concentrated by extraction with a mixture containing 2 vols. commercial ether to 1 vol. petroleum ether, 90–95% extraction being obtained. The residues contain the remaining 5–10% and are reconcentrated by extraction with methylated ether.

The extract consists of 16–18 vols. of 92–95% acetic acid and 82–84 vols. of solvent, and on distillation yields acid of 92–95% concentration.

What I claim and desire to secure by Letters Patent is:—

1. Process for concentrating aqueous solutions of lower aliphatic acids comprising concentrating in a plurality of stages by extraction with solvent media, employing media, for the various stages such that the ratio of the solubility of the lower fatty acid in the extracting medium to that of water in the extracting medium in the ternary mixture increases successively from stage to stage.

2. Process for concentrating aqueous solutions of lower aliphatic acids comprising concentrating in a plurality of stages by extraction with solvent media, employing media for the various stages such that the ratio of the solubility of the lower fatty acid in the extracting medium to that of water in the extracting medium in the ternary mixture increases successively from stage to stage, the extraction medium for the final stage being incapable of dissolving substantial quantities of water together with the acid.

3. Process for concentrating aqueous solutions of lower aliphatic acids comprising concentrating in a plurality of stages by extraction with solvent media, employing media for the various stages such that the ratio of the solubility of the lower fatty acid in the extracting medium to that of water in the extracting medium in the ternary mixture increases successively from stage to stage, the extraction medium for the final stage being incapable of dissolving substantially more water than will pass off with it on subsequent distillation of the extract.

4. Process for concentrating aqueous solutions of acetic acid comprising concentrating in two stages by extraction with solvent media, employing media for the two stages such that the ratio of the solubility of the acetic acid in the extraction medium to that of water in the extracting medium in the ternary mixture is greater in the second stage than in the first stage.

5. Process according to claim 4 wherein the extraction media have boiling points sufficiently below that of acetic acid to permit of easy separation by fractional distillation.

6. Process for concentrating aqueous solutions of acetic acid comprising concentrating in two stages by extraction with solvent media, employing media for the two stages such that the ratio of the solubility of the acetic acid in the extraction medium to that of water in the extracting medium in the ternary mixture is greater in the second stage than in the first stage, the extraction medium for the second stage being incapable of dissolving substantial quantities of water together with the acid.

7. Process for concentrating aqueous solutions of acetic acid comprising concentrating in two stages by extraction with solvent media, employing media for the two stages such that the ratio of the solubility of the acetic acid in the extraction medium to that of water in the extracting medium in the ternary mixture is greater in the second stage than in the first stage, the extraction medium for the second stage being incapable of dissolving substantially more water than will pass off with it on subsequent distillation of the extract.

8. Process for concentrating aqueous solutions of acetic acid comprising first concentrating up to 50–70 per cent strength by extraction with a solvent medium and thereafter further concentrating by extraction with a second solvent medium, employing extraction media for the two stages such that the ratio of the solubility of the acetic acid in the extraction medium to that of water in the extracting medium in the ternary mixture is greater in the second stage than in the first stage.

9. Process for concentrating aqueous solutions of acetic acid comprising first concentrating up to 50–70 per cent strength by extraction with a solvent medium and thereafter further concentrating by extraction with a second solvent medium, employing extraction media for the two stages such that the ratio of the solubility of the acetic acid in the extraction medium to that of water in the extracting medium in the ternary mixture is greater in the second stage than in the first stage, the extraction medium for the second stage being incapable of dissolving substantial quantities of water together with the acid.

10. Process for concentrating aqueous solutions of acetic acid comprising first concentrating up to 50–70 per cent strength by extraction with a solvent medium and thereafter further concentrating by extraction with a second solvent medium, employing extraction media for the two stages such that the ratio of the solubility of the acetic acid in the extraction medium to that of water in the extracting medium in the ternary mixture is greater in the second stage than in the first stage, the extraction medium for the second stage being incapable of dissolving substantially more water than will pass off with it on subsequent distillation of the extract.

11. Process for the concentration of aqueous solutions of acetic acid comprising partially concentrating by extraction with ether and further concentrating the partially concentrated acid by extraction with methylene chloride.

12. Process for the concentration of dilute aqueous solutions of acetic acid comprising concentrating up to 50–70 per cent strength by extraction with ether and further concentrating the 50–70 per cent acid by extraction with methylene chloride.

In testimony whereof I have hereunto subscribed my name.

JOSEPH BILLING.